United States Patent

[11] 3,592,278

[72] Inventors Harold L. Shumaker
Monroeville;
James B. Rupert, Bellevue, both of, Pa.
[21] Appl. No. 40,505
[22] Filed May 26, 1970
[45] Patented July 13, 1971
[73] Assignee Westinghouse Air Brake Company
Swissvale, Pa.

[54] VEHICLE WEIGHT CLASSIFIER WITH LOAD LIMIT MEANS
10 Claims, 3 Drawing Figs.
[52] U.S. Cl. ............................................. 177/132,
177/163, 177/210
[51] Int. Cl. ............................................. G01g 19/52
[50] Field of Search ...................................... 177/132,
133, 163, 210, 211

[56] References Cited
UNITED STATES PATENTS
2,779,583 1/1957 Bone .......................... 177/210 X
2,902,595 9/1959 Bone .......................... 177/210 X
2,987,613 6/1961 Jefferson et al. .............. 177/163 X

*Primary Examiner*—Stephen J. Tomsky
*Assistant Examiner*—George H. Miller, Jr.
*Attorneys*—H. A. Williamson, A. G. Williamson, Jr. and J. B. Sotak ABSTRACT: Our invention relates to a weigh rail having a crown, a web and a flange portion and an elongated slot extending transversely through the web portion between the crown and flange portions. A pivotal lever having one end is interposed into the slot so that downward deflection of the crown portion produces an angular rotation of the pivotal lever. A plurality of switching devices are disposed adjacent the other end of the pivotal lever. Each of the switching devices includes an actuator which is adapted to be selectively released in accordance with the amount of crown deflection and in turn pivotal rotation so that passing railway vehicles are categorized into weight classes.

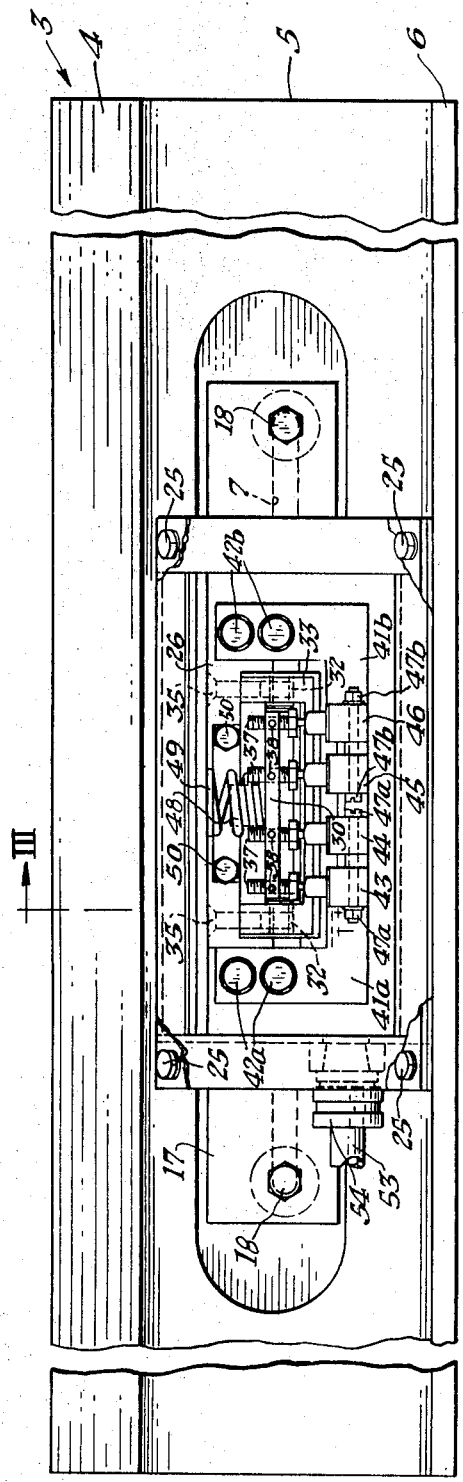
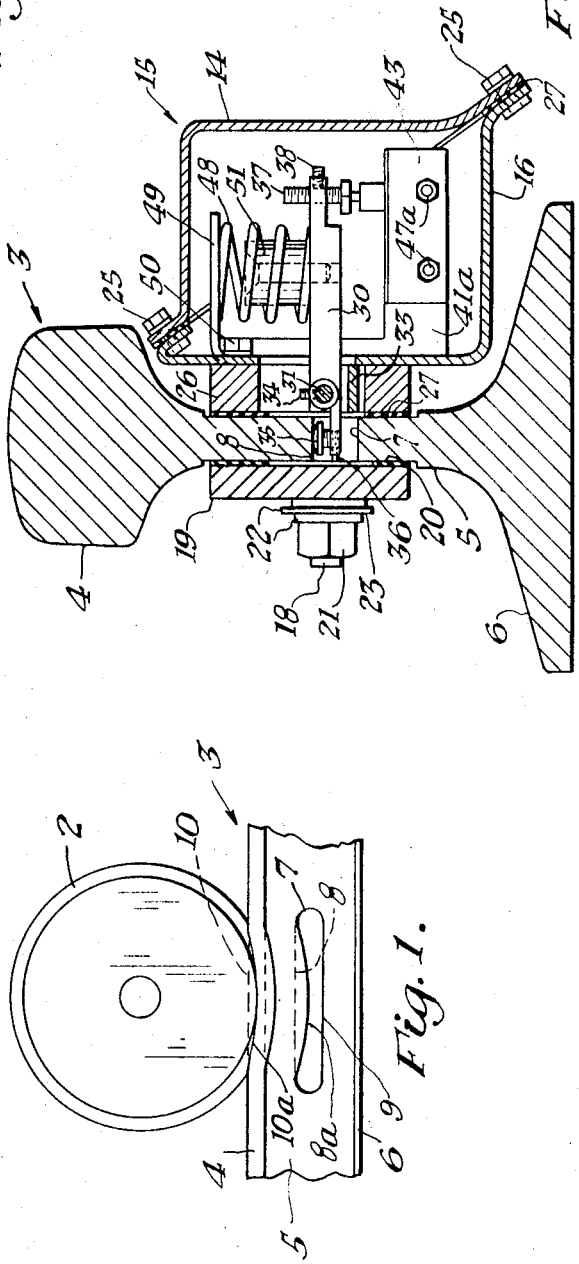
INVENTORS
Harold L. Shumaker and
James B. Rupert.
BY
John B. Sotak

VEHICLE WEIGHT CLASSIFIER WITH LOAD LIMIT MEANS

Our invention relates to a railway vehicle weight responsive means and more particularly to improved means mounted in cooperative association with a slot formed in the intermediate web portion of a weigh rail and responsive to the deflection of the crown portion above the slot as car wheels pass over this weigh rail.

In automatic classification yards, there is a need for a quick-acting weight-responsive device which will categorize railway vehicles into weight classes as they are about to be processed. The weight information is one of the parameters used in computing the braking effort of the automatically controlled retarders wherein the leaving speed of a vehicle is set in proportion to its weight. Thus, a lightly loaded vehicle should receive a low initial retarder pressure while a heavy-loaded vehicle should receive a high initial retarder pressure. In previous types of weight-measuring apparatus, the deflection of the rail was employed and translated into weight classes or categories by a plurality of leaf spring contacts each of which was depressed and closed in accordance with the weights of the passing vehicles. Such previous arrangements have the disadvantage of producing inaccurate weight indications when the weigh rail becomes fractured. For example, a broken weigh rail allows excessive rail deflection to occur which in turn distorts the leaf spring contacts. That is, in prior art devices a fractured rail crown generally caused excessive lever movement which in turn bent the leaf springs out of shape and beyond their elastic limits. Thus, the weights of subsequently processed vehicles were underrated and resulted in damage to the lading and to the vehicle, itself, since the amount of retardation was improper. That is, a heavy-loaded vehicle was only capable of closing the light or medium indication contacts so that insufficient pressure was exerted on the vehicle wheels, and therefore the leaving speed of the railway vehicle was too high for its length of travel to the destination point in the classification track. Thus, the impetus of the moving vehicle resulted in serious damage when a collision occurred with other vehicles standing in the classification track. In some cases, the speed was sufficient to allow the moving vehicle to leave the classification track and move on to the main exit track and on occasion resulted in the derailment of vehicle through an open switch. Thus, it is necessary to insure that a broken weigh rail must not produce a weight indication which is less than the actual weight of the passing railway vehicle.

Accordingly, it is an object of our invention to provide a new and improved railway weight apparatus which is not adversely affected by a broken weigh rail.

Another object of our invention is to provide a new and improved railway weigh rail having low installation and maintenance costs.

A further object of our invention is to provide a novel railway vehicle weighing device for amplifying the small rail head deflection changes by employing a lever having a relatively large mechanical advantage.

Yet another object of our invention is to provide a weigh rail for determining car weight classes by actuating a plurality of switches which are controlled by the amount of deflection in the weigh rail by the passage of car wheels over the crown portion of the rail of the slot.

Still yet another object of our invention is to provide a novel slotted track rail which is capable of classifying cars according to weight and which is not adversely affected by a fractured weigh rail.

Still another object of our invention is to provide a new and improved slotted railway vehicle weighing device which will not erroneously indicate a weight class which is less than the actual weight of the vehicle.

Yet another object of our invention is to provide a new and improved weight-responsive means which is economical in cost, simple in construction, reliable in operation, durable in use, and efficient in service.

In the attainment of the foregoing objects, the present invention employs a weigh rail for weighing a railway vehicle as it moves through a section of track. The weigh rail includes a crown, a web and a flange portion and is provided with an elongated slot disposed between the crown and flange portions. The slot extends transversely through the web portion and has a relatively long dimension coincident with the length of the rail. An elongated pivotal lever is mounted adjacent to the outboard side of the elongated slot and has one end projecting into the elongated slot. A master adjusting screw is carried by the one end of the pivotal lever and engages the upper surface of the elongated slot. A plurality of microswitches are disposed adjacent the other end of the pivotal lever. Each of the microswitches includes electrical contacts which are actuated by a plunger. Each of the plungers is disposed adjacent individual adjusting bolts which are carried by the other end of the pivotal lever. A biasing spring cooperates with the pivotal lever and constantly urges the master adjusting screw against the upper surface of the elongated slot and normally causes the individual adjusting bolts to depress the plungers of the microswitches so that the electrical contacts assume a first electrical condition. A housing is secured to the outboard side of the weigh rail and a sealing plate is secured to the inboard side of the weigh rail to prevent the entrance of moisture, dust, dirt and the like. Each of the microswitches is adapted to assume a second electrical condition when its depressed plunger is released. Thus, when a railway vehicle passes over the crown of the weigh rail, the deflection is transmitted through the pivotal lever to the plungers of the microswitches to allow the condition of the electrical contacts to be selectively changed in accordance with the weight of the passing railway vehicle.

Other objects and advantages of the present invention will become apparent from the ensuing description of the various illustrative embodiments thereof in the course of which references is had to the accompanying drawings in which:

FIG. 1 is a schematic diagram illustrating a vehicle wheel passing over a rail section which has an elongated slot formed in its web portion.

FIG. 2 is a side elevational view of the weighing apparatus embodying the invention showing the weigh rail in the absence of a wheel of a railway vehicle and with sealing cover partially removed to show the details of the internal components.

FIG. 3 is an enlarged cross sectional view taken along lines III—III of FIG. 2.

Referring now to the drawings and particularly to FIG. 1, there is shown a railway vehicle wheel 2 traversing a weigh rail section 3. The weigh rail section 3 consists of a running crown portion 4, an intermediate web portion 5, and a supporting flange portion 6 suitably secured to conventional ties (not shown) in the usual manner. A slot 7 is formed in the weigh rail 3 and extends transversely through the web portion 5. The slot 7 is shown having a relatively long dimension longitudinally along the rail of the weigh rail section 3. The elongated slot 7 includes a movable upper surface 8 and a stationary lower surface 9. Accordingly, whenever the wheel 2 of the railway vehicle passes over the slot 7 and is centrally located as shown in FIG. 1, the upper crown portion 4 of the rail section 3 will be deflected from a normal position as shown in dotted lines 10 to a deformed position as shown by the slightly exaggerated solid line 10 a. The amount of deflection of the crown of the rail section 3 will, of course, vary with the weight of each passing vehicle. The deflection of the upper crown portion 4 of the rail section 3 will cause a corresponding or proportional amount of deflection to occur to the upper surface 8 of slot 7, as shown by the slightly exaggerated solid outline 8 a. Further, it will be appreciated that the maximum deflection will occur when the central axis of the wheel is directly over the center of the slot 7. Hence, by employing this deflection of the rail and particularly by measuring the amount of deflection under various weights of vehicles, it is possible to categorize and class the vehicles by their weight for use in automatic classification yard operations.

It has been found that digital weight indications are sufficiently accurate for the computer-controlled retarders in automatic classification yard operations. However, it has also been established that it is highly undesirable to provide an erroneous vehicle weight indication which is less than the actual railway vehicle weight since the vehicle would be allowed to leave the retarder faster than is actually necessary to reach its destination. In the past, such erroneous readings occurred when the weigh rail became fractured or broken due to fatigue. A broken rail head allowed a railway vehicle to cause an excessive amount of deflection which depressed the electrical leaf spring contacts and bent them beyond their elastic limit. Thereafter, the spring contacts remained closed or were incapable of being closed so that a heavily loaded vehicle could erroneously simulate a lightly or medium-loaded vehicle.

Referring now to FIGS. 2 and 3 of the drawings showing the preferred embodiment of our invention, the reference character 15 designates the weight-responsive device or apparatus used to weigh the load exerted by the wheels of railway vehicles. The weight-responsive device 15 is located on the outboard side of weigh rail 3 which is situated between two of the spaced crossties (not shown). The weight-responsive device 15 includes a protective casing or enclosure comprising a two-section boxlike structure. The casing 15 is provided with a rear, bottom, and sidewalls and is enclosed by a front removable cover 14. The cover 14 is attached by means of bolts 25 which pass through the openings provided in the four corners thereof and threadedly engage corresponding threaded openings provided in the back section 16. A rubber gasket 13 is situated between the edges of cover 14 and the back section 16 to seal the case against moisture, dirt, dust and the like. The back section 16 of the casing is provided with lugs or ears 17 extending from each side thereof. The lugs are provided with openings for receiving the securing bolts 18. A front sealing plate or cover bar 26 is carried by the rear wall of the back portion 16 and functions as a spacer and carries a pivotal support for a pivotal lever shaft, as will be described presently. A rubber gasket 27 or the like is interposed between the machined surface of the web and the adjacent surface of the plate 26 to seal against the entrance of moisture and foreign matter. Bolts 18 pass through the slot 7 and also through the aligned openings provided in a backplate 19 which covers the inboard or gauge side of the elongated slot 7. A rubber gasket 20 or the like is interposed between the machined surface of the web portion of the rail 3 and the adjacent surface of the backplate 19 to provide a dust free and moisture free seal against the elements of the millieu. Secured to the threaded portions of through bolts 18 are nuts 21, a pair of appropriate flat washers 22 and a lockwasher 23 which when tightened securely holds the device to the weigh rail.

As shown more clearly in FIG. 3, an elongated pivotal lever 30 is housed within the casing 15 and is supported by a rotatable shaft 31. Each end of the shaft 31 is disposed within bushings 32 carried by each leg of a U-shaped supporting block member 33. The U-shaped supporting member is secured within the rectangular opening of the front sealing plate 26 by means of flat-headed screws 35. A soft tip setscrew 34 or the like is threaded into the lever 30 and securely holds lever 30 onto the center of shaft 31. In viewing FIG. 3, it will be noted that one end of the lever 30, namely the left-hand end, projects horizontally into the longitudinal slot 7 formed in the web portion of the rail 3 while the other end of the lever 30 projects horizontally outwardly from the pivot point. It will be appreciated that the left-hand end is somewhat shorter than the right-hand end so that a multiplying or a mechanical advantage may be realized during rotational movement thereof. A master adjusting screw 35 is carried by the short end of the pivotal lever 30 and is positioned to engage the center portion of the under surface 8 of the slot 7 of the weigh rail 3. This screw may be threadedly adjusted at the factory to ensure that the proper amount or degree of rotational movement will be imparted to the lever by the rail deflection when the vehicle wheels pass over the weigh rail 3. A soft tip setscrew 36 or the like is screwed into the lever 30 to securely hold the master screw in the proper position after the necessary adjustments have been made at the factory. The outwardly projecting or long end of the pivot lever 30 is provided with a series or a plurality of flat-headed adjustable bolts or screws 37 near the outer extremity thereof. As shown, the top end portion of the left-hand end and the bottom end portion of the right-hand end of the pivotal lever 30 have been cutaway or removed to allow clearance for the heads of screw 35 and bolts 37 so that maximum deflection may be obtained for any given slot width and lever thickness. For automatic classification yard systems, the vehicle weights need only be categorized or divided into four classes, namely, light, medium, heavy, and extra-heavy railway vehicles. For the purpose of convenience, it will be assumed that the microswitch 43 represents the extra-heavy class (110 tons and over), microswitch 44 represents the light class (up to 35 tons), microswitch 45 represents the medium class (35 to 52 tons), and microswitch 46 represents the heavy class (52 to 110 tons).

Supported within the casing is a pair of L-shaped supporting members 41a and 41b having one leg projecting vertically upwardly and the other leg projecting horizontally outwardly. The vertical legs of the L-shaped members 41a and 42a are bolted to the front surface of the rear wall of the rear portion 16 by means of a pair of bolts 42a and 42b, respectively. As shown, a plurality of electrical contact types of switches, namely, the four microswitches 43, 44, 45, and 46 are securely fastened to the horizontal legs of the L-shaped supporting members 41a and 41b. For example, the microswitches 43 and 44 are rigidly secured to the supporting member 41a by means of bolts and nuts 47a while the microswitches are rigidly secured to the supporting member 41b by means of bolts and nuts 47b. Each of the microswitches is provided with a plunger or actuator which is controllingly coupled to the electrical contacts. The electrical contacts are preferably housed within a weatherproof insulative enclosure so that the change of contact fouling is appreciably reduced. The plunger is normally urged upwardly or outwardly by a conventional biasing spring (not shown) so that a downward force must be exerted for depressing the plunger. This downward force is provided by the lever 30 and is conveyed to the microswitch plungers through the adjusting screws 37. It will be understood that the screws 37 are adjusted to release the plungers in a given order or sequence so that the angular rotation of the lever 30 is divided into increments indicative of the above-noted vehicle weight classes. The plunger of each microswitch is preferably located directly beneath the flat undersurface of each of the adjustable screws 37 and is fully depressed when no weighing operation is taking place as shown in FIGS. 2 and 3. It will be appreciated that the internal electrical contacts may be either normally opened or normally closed, and that the subsequent release of the plunger will cause the electrical contacts to assume their opposite electrical condition.

A helical biasing spring 48 normally urges the lever 30 downwardly or in a clockwise direction as viewed in FIG. 3. The biasing spring 48 communicates with the upper surface of the lever 30 and the under surface of the L-shaped bracket 49 which is securely fastened to the rear wall of the back portion 16 by means of a pair of bolts 50. The spring 48 preferably surrounds a cylindrical plug 51 which is fastened to the upper surface of the lever 30 by a suitable screw or bolts (not characterized) so that the spring is maintained under compression and in guided alignment between the lever 30 and bracket 49.

Appropriate internal electrical leads (not shown) are connected to the electrical contacts of each of the microswitches so that circuit paths may be established to the externally controlled circuits. To accomplish this there is shown a multilead flexible cable 53 passing through the aperture of a watertight coupler 54 securing and sealing the cable in place.

Let us now assume that the weigh rail has been installed, that all the adjustments have been made and the device is operating properly and that there is no vehicle passing over the weigh rail 3 so that the weight-responsive device 15 will assume a position as shown in FIGS. 2 and 3. Under this condition, the compression spring 48 normally urges the lever 30 in a clockwise direction so that the master adjusting screw 35 will engage the upper surface 8a of the slot 7. Under this condition, the plunger of each of the microswitches 43, 44, 45, and 46 is depressed. If we are operating on a closed circuit principle, the electrical contacts of each of the microswitches will be closed and an electrical path will be established to the associated external circuits thereby signifying that no vehicle is being weighed. Now when the railway vehicle enters the weighing track section and passes over the center of the weigh rail 3, a given amount of deflection of the head portion will occur, as shown in FIG. 1. As previously mentioned, the amount or degree of deflection is proportional to the vehicle weight and the load sustained by the vehicle wheel 2. If we assume that the railway vehicle is in the lightweight class, the lever 30 will be rotated in a counterclockwise direction, as viewed in FIG. 3 by the rail deflection which pushes down on the master adjusting screw 35. Since the vehicle is a lightly loaded car, only a small degree of translational or rotational movement will be imparted to the pivotal lever 30 so that the electrical contacts of microswitch 44 are permitted to open by the release of its plunger. Thus, the change in the electrical condition of the microswitch 44 will indicate that the railway car falls within the lightweight class.

Now when a passing railway vehicle is an extra heavy loaded car, all the electrical contacts will change their electrical condition due to the release of all the plungers of the microswitches 43, 44, 45, and 46 so that an indication is produced which signifies that the railway vehicle falls within the extra-heavyweight class. Similarly, any medium and heavy load vehicle will cause the plungers of the microswitches 45 and 46 to be released and will also cause the plunger of microswitch 43 to be released so that this electrical contact change can be employed to signify the medium and heavyweight classes.

It will be appreciated that since the rotational movement of the lever 30 is always away from the microswitch upon deflection of the weigh rail, the breakage of the rail head will not cause any damage to the weight-responsive device as in the past. That is, the electrical contacts of the microswitches can not be distorted by a broken rail, and thereby cause an erroneous and dangerous weight indication, namely, a lighter weight class indication than into which the vehicle actually falls. In fact, the presently described weight-responsive device will always signify a heavier weight class than the actual weight since more of the microswitch plungers will be released due to the increased deflection imparted to the broken head portion of the weigh rail 3. For example, a lightly loaded vehicle will generally cause the plungers of both the lightweight and the mediumweight microswitches to be released during a broken weigh rail condition so that increased retardation is effected and the vehicle is released at a slower speed than normal. Thus, a higher degree of safety is realized and less chance of damage will occur to the lading and the vehicles, themselves.

It is to be understood that it is well within the scope of our invention to vary the rail slot position, shape, and size to obtain the amount of rail head deflection desired. Further, it is understood that the size and shape of the pivotal lever 30 may be varied to either increase the mechanical advantage or to allow repositioning of the other elements, such as, the microswitches, the biasing spring, etc. In addition, it is apparent that lever or roller-operated microswitches or other switching mechanisms may be employed in place of the plunger-operated microswitches as shown and disclosed. Also it is understood that more or less than four switches may be employed in practicing our invention.

An underlining feature of the invention is to utilize the rail deflection to move the lever 30 away from the microswitches rather than toward the microswitches so that the electrical contacts are released rather than depressed during a weighing operation.

Although we have shown and described only one form of a weight-responsive device embodying our invention, it is understood that various changes, alterations, and modifications may be made therein within the breadth of the appended claims without departing from the spirit and scope of the invention.

Having thus described our invention, what we claim is:

1. A railway-vehicle-weighing device comprising, a track rail having a crown, a web and a flange and having a portion of the web removed to form an elongated slot, a pivotal lever mounted adjacent said elongated slot, said pivotal lever having one end projecting into said elongated slot and communicating with the upper surface of said elongated slot, a plurality of switch means disposed adjacent the other end of said pivotal lever, each of said plurality of switching means having electrical contacts which are arranged to move and signify increasingly different vehicle weight classes as more contacts open so that when a vehicle passes over the crown of the track rail the deflection of said upper surface causes the one end of said pivotal lever to move downwardly which results in the other end of said pivotal lever to move away from said switching means thereby preventing damage to the switching means when deflection is excessive.

2. A railway-vehicle-weighing device as defined in claim 1, wherein an adjusting screw threadedly engages the one end of said pivotal lever for providing a master adjustment for said pivotal lever.

3. A railway-vehicle-weighing device as defined in claim 1, wherein a plurality of adjusting screws threadedly engage the other end of said pivotal lever for providing an individual adjustment for each of said plurality of switching means.

4. A railway-vehicle-weighing device as defined in claim 2, wherein said pivotal lever is pivoted above a horizontal axis parallel to the length of the track rail and wherein the distance from said horizontal axis to the other end of said pivotal lever is greater than the distance from said horizontal axis to the one end of said pivotal lever so that a mechanical advantage is realized.

5. A railway-vehicle-weighing device as defined in claim 1, wherein each of said plurality of switching means comprises a microswitch having an actuator which is disposed below the other end of said pivotal lever.

6. A railway-vehicle-weighing device as defined in claim 5, said microswitches include normally closed contacts which are actuated by a plunger.

7. A railway-vehicle-weighing device as defined in claim 1, wherein a biasing spring constantly urges the one end of said pivotal lever against said upper surface of said elongated slot.

8. A railway-vehicle-weighing device as defined in claim 7, said biasing spring takes the form of a helical spring which is under compression between the upper surface of said pivotal lever and under surface of one leg of an L-shaped bracket.

9. A railway-vehicle-weighing device as defined in claim 1, a protective case is attached to the outboard side of the web of the track rail for enclosing the internal components of the weighing device.

10. A railway-vehicle-weighing device as defined in claim 9, wherein a back plate is secured to the inboard side of the web for sealing said slot.